US006729004B1

(12) United States Patent
Joshi

(10) Patent No.: US 6,729,004 B1
(45) Date of Patent: May 4, 2004

(54) LOCKWIRE REMOVAL TOOL

(75) Inventor: Vasant S. Joshi, La Plata, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 41 days.

(21) Appl. No.: 10/292,947

(22) Filed: Nov. 13, 2002

(51) Int. Cl.[7] .................................................. B23P 19/04
(52) U.S. Cl. ....................................... 29/250; 140/123.5
(58) Field of Search ................................ 29/229, 281.6, 29/250; 140/123, 123.5; 254/100, 231

(56) References Cited

U.S. PATENT DOCUMENTS

| | | | | | |
|---|---|---|---|---|---|
| 367,773 | A | | 2/1887 | Keenan | |
| 1,273,484 | A | | 7/1918 | Hammar | |
| 1,421,935 | A | * | 7/1922 | Gilbert | 254/231 |
| 2,900,169 | A | | 8/1959 | White | 254/20 |
| 3,027,631 | A | * | 4/1962 | Nathan | 29/250 |
| 4,236,291 | A | | 12/1980 | Barrow | 29/256 |
| 6,095,498 | A | | 8/2000 | Lemoine | 254/30 |

* cited by examiner

*Primary Examiner*—Lowell A. Larson
(74) *Attorney, Agent, or Firm*—Mark Homer

(57) ABSTRACT

A tool for pulling a lockwire, which extends around the intersection of mating cylindrical surfaces within a case and extends tangentially from between these surfaces through an opening in the case to a termination at the exterior of the case, has a body which mates at one side with conforming exterior elements of the case adjacent to the opening. The body extends tangentially of the surfaces from the one body side and the case opening. The tool has an extraction rod extended from the case opening through a square passage within the body. The lockwire is of rectangular cross section with opposite surfaces which are parallel to the axis of the mating case surfaces, and the lockwire termination has a hole extending between these surfaces. One rod end portion is of square cross section fitted to the passage and ends in jaws disposed to fit oppositely over these lockwire termination surfaces so that bores in the jaws are aligned with the lockwire hole. An opening in the body is disposed for the insertion of a pin through this opening and into the bores and the hole to connect the rod and the lockwire. The opposite rod end portion is screw threaded and bears a nut outwardly of the body. With this structure, appropriate rotation of the nut draws the rod away from the case and withdraws the lock wire tangentially from between the mating cylindrical surfaces within the case.

11 Claims, 4 Drawing Sheets

LOCKWIRE REMOVAL TOOL

BACKGROUND OF THE INVENTION (1) Field of the Invention

The present invention relates to tools, pulling implements, and metal working apparatus having axially shiftable puller elements; and, particularly, relates to such devices including a bar forming a work extractor engaging a strap or wire for tensioning and to such devices including screw apparatus.

(2) Description of the Related Art

The present invention is particularly adapted to removal of a lock wire which retains a generally circular head within an open end of a generally cylindrical can forming, with the head, a case of a conventional gas generator. The drawings show a representative such case with its can, head, and lockwire identified by respective numerals 10–12. The lock wire has a hole 13 which is utilized with the present invention. The gas generator is not, in other respects, directly related to the present invention.

However, as further background of the invention, it is explained that the case contains a quantity of combustible material which is ignited to generate hot cases which exit the case through a nozzle, not shown. When it is desired to dispose of unused such gas generators, it is necessary to open their cases and remove the combustible material.

However, it has been found that this is extremely difficult due to the relative inaccessibility of the lock wire after assembly of the case and due to corrosion of the case elements at the lock wire. Disposal of the gas generator by burning or opening the case by cutting into it are dangerous, so that, despite the difficulties involved, it has been attempted to withdraw the lock wire by engaging it with a clamp motivated by a slide hammer. However, this method is often unsuccessful and, in any event, is tedious and likely to result in injury.

SUMMARY OF THE INVENTION

In gas generator cases to which the present invention is particularly adapted, such head 11 is received within the can 10, the can having an internal cylindrical surface 20 and the head having an external surface 21 conforming to surface 20 and engaged therewith. Surfaces 20 and 21 have respective circumferential grooves 22 and 23 of rectangular cross section which are axially aligned so as to receive the lock wire 12. The wire has a cross section conforming closely to the groves and thus engages both the can and head so as to retain the head axially within the can. As will be explained in greater detail, the lock wire is installed through an opening 25 in the can which extends tangentially into grooves 22 and 23. An end of the lock wire extends from the grooves into opening 25 and bears a hole 13, this lock wire end being disposed so that the hole is barely accessible from the exterior of the can when the wire is installed therein.

A tool embodying the principles of the present invention is constructed to pull a wire or the like, which corresponds to lockwire 12, from within a structure such as a gas generator case where the wire is, typically, disposed between mating cylindrical surfaces such as surfaces 20 and 21 from which the wire extends tangentially through case opening 25 in the case to a termination of the wire disposed at the exterior of the case. The tool has a body which mates, as subsequently described, at one side with conforming exterior elements of the case adjacent to an opening corresponding to opening 25. The tool body is constructed so that, when so mated to the case, the body extends tangentially of such mating cylindrical surfaces and from this one body side. The tool has an extraction rod extended through the body within a square passage therein extending from the case opening and extended tangentially of the mating, cylindrical surfaces when the body is so mated.

A wire corresponding to lockwire 12 is typically of rectangular cross section with opposite surfaces, which are parallel to the axis of the cylindrical mating case surfaces, and with a cylindrical hole corresponding to hole 13 disposed in the lockwire termination so that this hole extends between these opposite lockwire surfaces.

The extraction rod portion adjacent to the case is of square cross section and is slidably fitted to the body passage through which the rod extends. This rod portion has a wire engaging end which is juxtapositionable to the case opening and lockwire hole and which has a pair of jaws disposed to fit oppositely over the before-mentioned lockwire termination surfaces so that a bore in each jaw is aligned with the hole. An opening in the tool body is disposed above the rod end and provides for the insertion of an extraction pin through this opening and then through the aligned jaw bores and lockwire hole, thereby connecting the rod and the lockwire.

The extraction rod end portion opposite the square portion of the rod is provided with male screw threads and extends outwardly of the body in a direction away from the wire engaging rod end when the jaws thereof are connected to the wire by the extraction pin. The tool is provided with a nut screw-threadably engaged with these rod threads outwardly of the body and oppositely of the case so that appropriate rotation of the nut urges the extraction rod away from the case so as to withdraw the wire with considerable force through an opening corresponding to opening 25 and in a direction tangentially from between the mating cylindrical surfaces within the case. This force is sufficient to withdraw the wire despite corrosion and other impediments to withdrawal of the wire.

It is an object of the present invention to provide a tool for extraction of a lockwire from between mating cylindrical elements such as a head and can of a gas generator case.

Another object is to provide such a tool generating sufficient force to so extract such a wire despite corrosion and other impediments to extraction.

Still another object is to provide such a tool which generates such force and yet is fitted to such a case and lockwire so that they are undamaged during extraction of the wire.

Yet another object is to provide such a tool having extraction elements configured to securely engage a lock wire termination which, when installed, is closely received and barely accessible within an opening of the case.

A further object is to provide such a tool which provides the above objects; which is easily portable, convenient and safe to use, and economical to construct; and which is fully effective.

BRIEF DESCRIPTION OF THE DRAWINGS

These and other objects, advantages, and novel features of the present invention will be apparent from the following detailed description when considered with the accompanying drawings wherein.

DETAILED DESCRIPTION OF THE INVENTION

Figure 1:
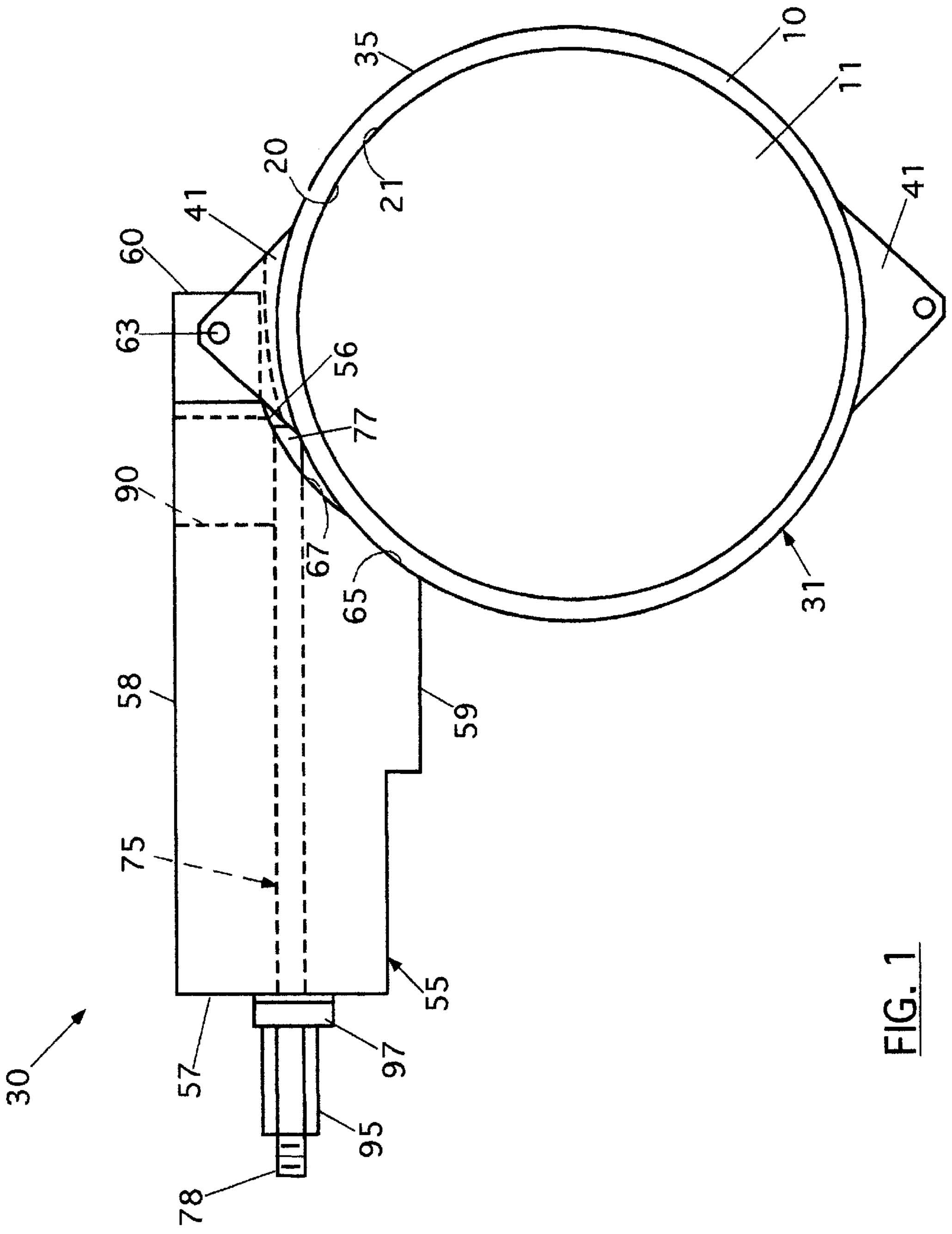
FIG. 1 is an axial end view of a gas generator case having mounted thereon a lock wire removal tool which embodies the principles of the present invention.
Figure 2:
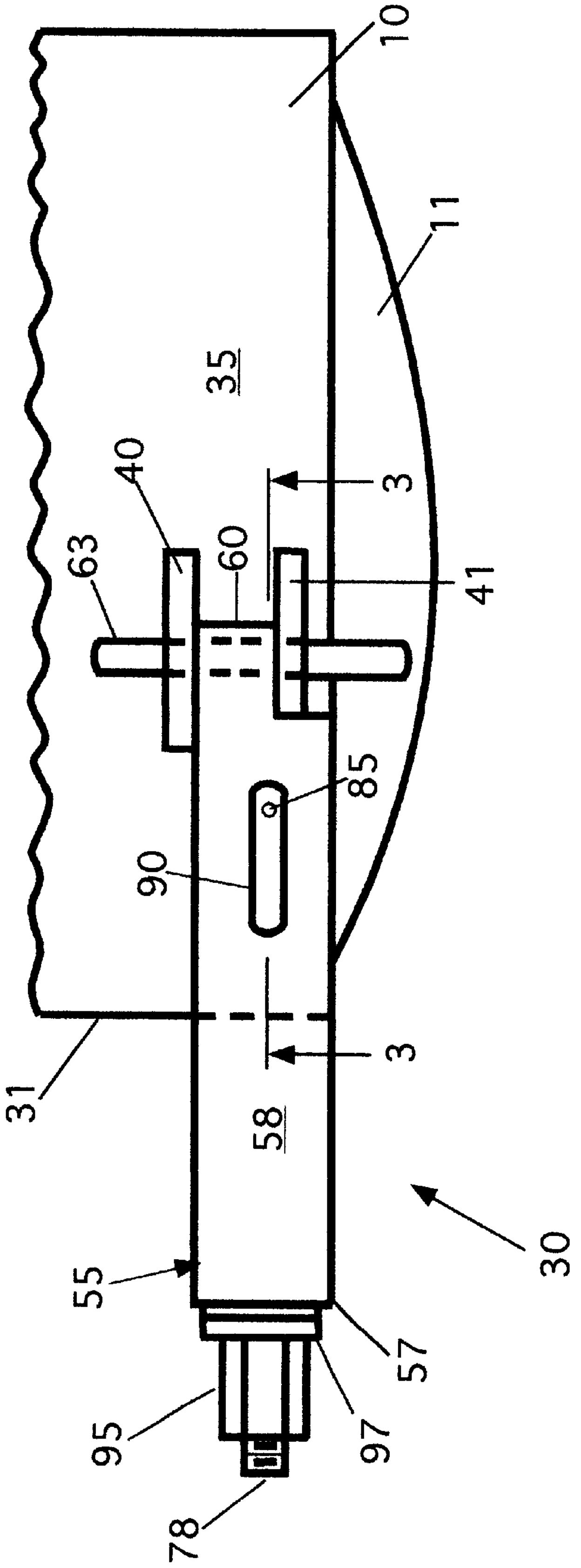
FIG. 2 is an top view of such a tool mounted on such a case which is fragmentarily represented.

Referring more particularly to the drawings, in FIGS. 1 and 2, a lockwire removal tool 30, which embodies the principles of the present invention, is shown mounted on a gas generator case 31, which is a work piece and representative operating environment for the tool, the tool being sometimes referred to in the claims as a "pulling implement".

Figure 3:
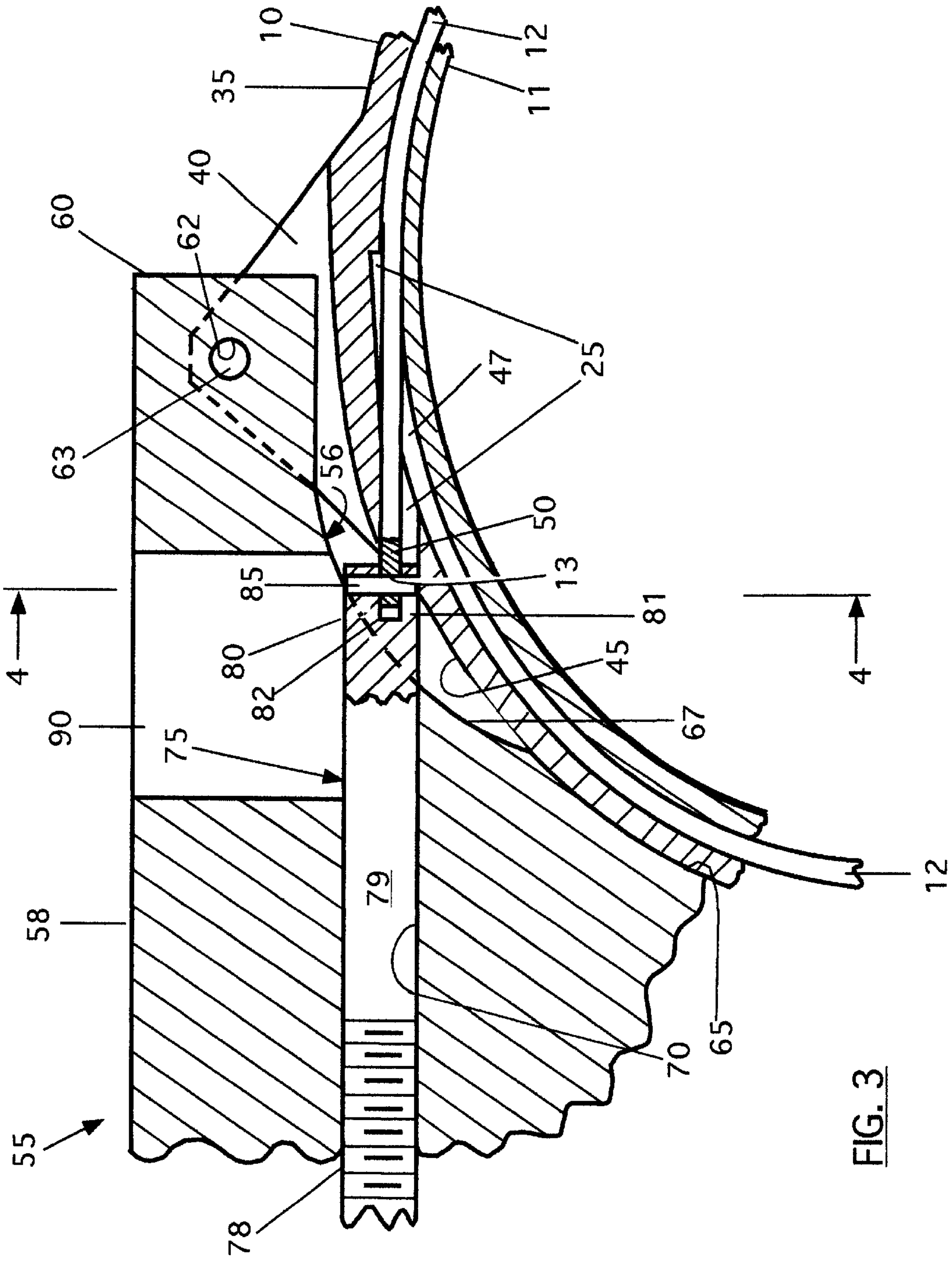
FIG. 3 is a fragmentary section of the tool and case taken from the position of line 3—3 of FIG. 2 at an enlarged scale and showing the tool engaged with a lock wire.
Figure 4:
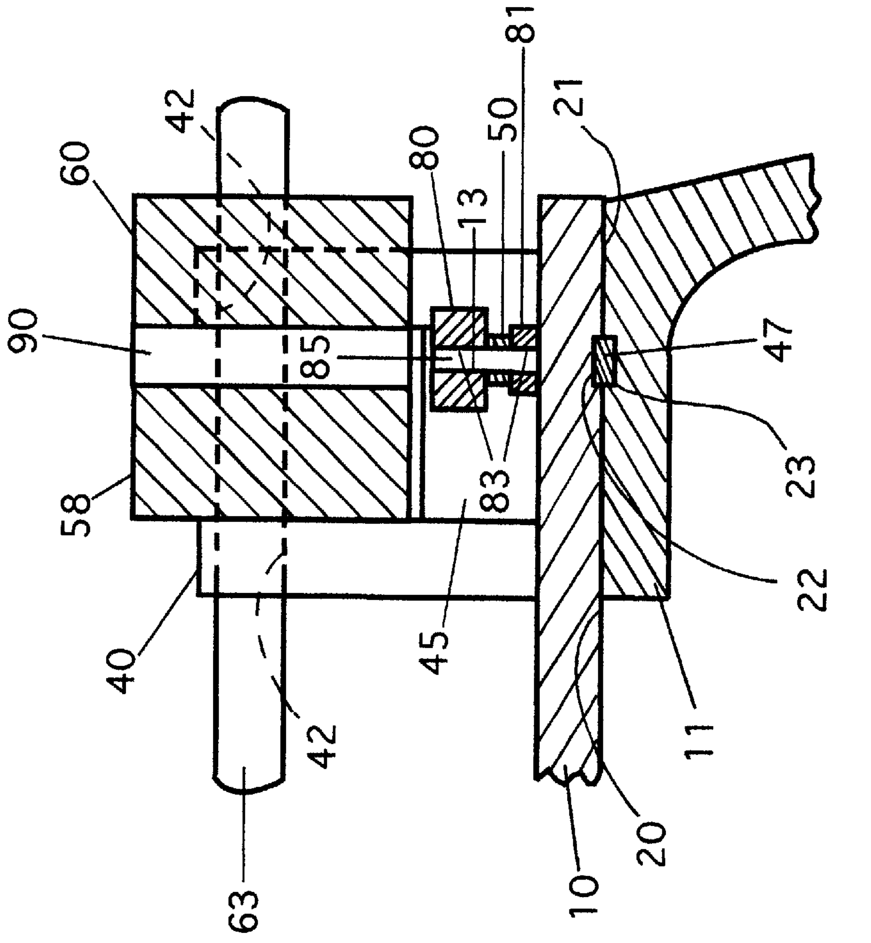
FIG. 4 is a fragmentary section of the tool and case taken from the position of line 4—4 of FIG. 3 and at a somewhat further enlarged scale.

Case 31 is typical of existing gas generator cases to which a tool of the present invention, such as tool 30, may be adapted, and the case is, accordingly, depicted with details unrelated to the present invention omitted. The case includes the above-identified outer member or can 10, an inner member or head 11, and elongated retaining member or lockwire 12 which is shown in FIGS. 3 and 4 and has a eye or cylindrical hole 13 which is sometimes referred to in the claims as a "removal bore" or "withdrawing opening". The case with its can and head are of circular or cylindrical configuration about a predetermined axis, not shown.

Can 10 serves as a cylindrical wall of case 31 and bears an exterior surface indicated generally by numeral 35. As before stated, head 11 is received within can 10 which has an internal surface 20, the head having an external surface 21 conforming thereto and engaged therewith. The head is thus fitted into the can at surface 20, so that surfaces 20 and 21 define an intersection of mating cylindrical surfaces within the a case. As best shown in FIG. 4, surfaces 20 and 21 have respective circumferential grooves 22 and 23 of rectangular cross section which are axially aligned and receive lock wire 12 which has a cross section conforming closely to these groves and thus engages both the can and head so as to prevent relative axial movement therebetween.

As shown in FIG. 1, can 10 has two diametrically opposed and generally radially extending lifting lug pairs, each pair having a lug 40 and a lug 41. Only one of these pairs is involved with the present invention, this being the pair adjacent to tool 30 and shown in greater detail in FIGS. 2 through 4. The lugs are generally triangular when viewed axially of case 31 and the lugs of each pair are spaced axially of the case, the lug 40 being spaced farther than the lug 41 from the edge of the case as seen in FIG. 2. The lugs have individual mounting bores 42 which are aligned and extend axially of the case and parallel to its axis. Either one of these bores is sometimes referred to in the claims a "first mounting bore".

Referring to FIGS. 3 and 4, it can be seen that can 10 has the before-identified lockwire 12 and opening or passage 25 which extend tangentially from surfaces 20 and 21 at grooves 22 and 23 to a region 45 of exterior surface 35. Axially of surface 35, region 45 is disposed between lugs 40 and 41 at the one side thereof at which tool 30 is mounted and from which the tool extends as shown in FIGS. 1 and 2 and as subsequently described. Axially of the depicted case 31, the passage and the lockwire are spaced somewhat more closely to lug 41 than to lug 40, and tool 30 is configured to conform to this spacing.

A representative lockwire 12 is typically of rectangular cross section with dimensions of about 0.125 by 0.1875 inch (about 3 by 5 millimeters) when used with a case, represented by case 31, having a diameter of about 14 inches or 356 millimeters, although the present invention is not, of course, limited to a work piece of any particular proportions or dimensions. As is apparent from FIGS. 3 and 4, the lock wire is installed in the case through passage 25 into grooves 22 and 23 so as to make therein approximately a complete circle to this passage so that the lock wire has a tail end 47 disposed at this passage.

The lockwire has an opposite end portion which extends tangentially from the portion of the lockwire in grooves 22 and 23 and thus tangentially from surfaces 20 and 21 through passage 25. This lockwire portion has a termination or end 50 of the lockwire, this termination having the eye 13 and being disposed at exterior surface 35. It is apparent that this termination is disposed between a pair of the lugs 40 and 41 adjacently to the surface 35 and at one side of the lugs in a direction circumferentially of the case surface 35. The rectangular cross section of the wire is disposed so that a pair of opposite surfaces of the wire are generally parallel to the axis of the surfaces 20 and 21, and eye 13 extends between these opposite lockwire surfaces and thus generally radially of this axis.

It can be seen from FIG. 3, that passage 25 is of somewhat larger cross section than lockwire 12, being about 0.25 inch (6.25 millimeters) square for the above lockwire dimensions. It can also be seen that, due to the arcuate configuration of surface 35 where the passage opens through this surface and the fact that the lockwire protrudes only slightly from the passage, lockwire termination 50 is only accessible in a direction into the passage tangentially of the surface 35 or in a direction radially toward this surface. As a result, eye 13 is, as before-mentioned, barely accessible from the exterior of the can when the wire is installed therein.

Tool 30 has a body, indicated generally by numeral 55, which as before-stated, is constructed so that, when the body is mounted on case 31, the body extends tangentially of such surfaces 22 and 23 and from a mounting portion or side 56 of the body, which is disposed at the case and variously conforms thereto as shortly to be described, so as to mount the tool on the case in a predetermined position in relation to passage 25. The other exterior aspects of a body corresponding to body 55 are not directly related to the present invention and may be of any convenient configuration. The depicted slab-like body, which extends from side 56 to an opposite or second body side 57 and may be constructed of 2024 aluminum, is convenient to manufacture and handle. In the depicted body, side 57 is planar as are an upper side 58 and a lower side 59 of the body.

Referring to the FIGURES, it is seen that body portion 56 has, downwardly of body side 58, an attachment projection 60 configured to extend between lugs 40 and 41 and fitted thereto, this projection being configured for insertion between the lugs by being spaced somewhat radially from case 31. Projection 60 has a bore 62 extending transversely through it. Bore 62 has the same diameter as bores 42 in the lugs and is disposed for alignment with bores 42 when tool 30 is mounted with its portion 56 in operating relation to case 31 at region 45 thereof.

Tool 30 includes a mounting pin 63 insertable through bores 42 and 62 to releasably retain the tool in such relation. It is evident that this pin is disposed at projection 60 for attaching the projection to the lugs 40 and 41 when the projection is extended between the lugs.

Upwardly of body side 59 and spaced downwardly from projection 60, body portion 56 has an arcuate region 65, which is sometimes referred to in the claims as a "work piece engaging region". Region 65 conforms to a corresponding region of the cylindrical exterior surface 35 of case 31, this corresponding region being opposite projection 60 from the opening of passage 25 in surface 35. Arcuate region 65 is thus disposed for engagement with the corresponding case region when pin 63 connects tool projection 60 and case lugs 40 and 41.

It is apparent from the above three paragraphs that tool portion 56 has members conforming to the wall of case 31 and fitted to the lugs 40 and 41 thereof for mounting tool 31 on the case in a predetermined position in relation to the opening of case passage 25.

Tool portion 56 also has an arcuate surface 67 connecting the lower side of projection 60 and arcuate surface 65. Surface 67 or any other suitable shape being provided as a "cut away" so that the body does not engage the lug 41 when projection 60 is inserted between this lug and the lug 40.

Body 55 has an elongated, straight channel 70 extending through it from its mounting portion 56 to its second side 57. This channel is of uniform, square cross section for a purpose shortly to be explained. The channel is disposed in the body so that, when the body is mounted on case 31 in the above-described operating relation or position thereto and as best seen in FIG. 3, the channel is aligned with the case passage 25 and, like this passage, extends tangentially of the case surfaces 20 and 21 from which the lockwire termination 12, which has the eye 13, also extends tangentially. It is evident that the channel is disposed as an extension of the lockwire passage when the tool is disposed in such operating relation. It is also evident that channel 70 extends in body 55 from its portion 56 toward its side 57, and that the body projection 60 and arcuate region 65 are disposed oppositely of the channel, the projection and this region being similarly opposite of the case passage and the lockwire in a direction circumferentially about the case when the body is mounted on the case in the such operating relation.

As best shown in FIGS. 1 and 3, tool 30 has an extraction or pulling rod 75 which is sometimes referred to in the claims as an "extraction member" and which extends through body channel 70 from projection 56 outwardly of body side 57 in relation to case 31 when the tool is disposed in the above-described operating position. This rod has a wire engaging or attachment end portion 77 which is sometimes referred to herein as including a "work engaging extremity" since the rod, when the tool is so disposed, is juxtapositionable to case passage 25 and thus to lockwire 12 and eye 13 therein. The rod has an opposite, screw-threaded end portion 78 which is sometimes referred to in the claims as a "motivating portion" since it is utilized in urging the rod in a direction from such work engaging extremity. The rod also has a central portion 79 which is of a square cross section slidably fitted to the square cross section of the body channel so that the rod is prevented from rotating relative to body 55 and is slidably received in the channel for movement from and into the passage when the tool is so disposed.

Rod end portion 77 is configured for reception of and attachment to termination or end 50 of lockwire 12 at withdrawing opening or passage 25 when the rod is extended a relatively short distance into the passage. The rod end portion and such attachment will now be described in greater detail with reference to FIGS. 3 and 4.

Rod portion 77 has a pair of jaws 80 and 81 spaced transversely of the rod, in a direction which is upwardly and downwardly in FIGS. 3 and 4, so as to define between these jaws a slot 82 conforming to the cross section of lockwire 12. In such direction, the slot is disposed in rod 75 so as to receive lockwire termination 50 when tool 30 is disposed in the above-described operating position in relation to case 31.

In FIG. 4, it is seen that the upper jaw 80 is wider in both transverse directions than the lower jaw 81. This is a feature of the depicted tool 30 wherein the tool is used with a case 31 having predetermined dimensions. More specifically, the square cross section portion of rod 75 has, for strength, dimensions of 0.5 inch (12.7 millimeters) while, as is apparent in FIG. 3, lower jaw 81 must enter somewhat into passage 25 which is, as before stated, 0.25 inch (6.35 millimeters) square. However, due to the configuration of case surface 35, the upper jaw is disposed outwardly of the passage and can have the same width as such square cross section portion. It is also apparent from FIG. 3 that, with this construction of the case, the lockwire termination 50 with eye 13 is accessible in a direction generally radially of the case.

Each of the jaws 80 and 81 has a attaching opening or bore 83 alignable with lockwire hole or eye 13 when lockwire end or termination 50 is received in slot 82 so that the two bores extend oppositely from the lockwire termination. Bores 83 have substantially the same diameter as the eye and thus conform transversely thereto.

Tool 30 includes a pin 85, which is shown in FIGS. 2 through 4 and is variously referred to herein as an extraction, connecting, or attachment pin. This pin conforms diametrically, and thus transversely, to eye 13 and bores 83 and has a length substantially equal to a side of the square portion of rod 75. This pin is thus removably insertable through the eye and these bores so as to connect rod 75 with lockwire 12 when the eye and these bores are axially aligned by disposing tool 30 in the above-described operating position in relation to case 31 with lockwire termination 50 in slot 82.

Body 55 has an opening or aperture 90 extending from the body upper side 58 to channel 70 at a position along the channel for visual and physical access in a direction toward lockwire termination 50 when the tool 30 is disposed in the above-described operating position in relation to case 31. It is evident from FIG. 3, that this direction is generally radially of case 31 and toward passage 25 in region 45 of case surface 35. Aperture 90 thus provides access to the upper jaw 80 and to aligned bores 83 and eye 13 when the tool is so disposed and lockwire termination 50 is received in slot 82. Aperture 90 is thus disposed to facilitate connection of rod portion 77 to lockwire 12 by introducing pin 85 through the aperture and then sequentially through the bore in jaw 80, through eye 13, and the bore in jaw 81, thereby connecting rod 75 with lockwire 12 as previously described.

When rod 75 and lockwire 12 are so connected, rod 75 can be urged through channel 70 to withdraw the lockwire, or at least its termination 50, from case 31. In the depicted embodiment of the present invention, this is achieved by providing tool 30 with an axially elongated nut 95 which screw-threadably engages rod portion 78 outwardly of body 55 from body surface 57. Tool 30 is preferably provided with a conventional ball-bearing, thrust washer 97 disposed on this rod portion between the nut and the body. It is apparent that appropriate rotation of the nut in relation to the body, when the tool is in the above described operating position in relation to case 31 and lockwire 12 is connected to the rod, urges the rod along channel 70 in a direction from rod portion 77 toward rod portion 78 so as to withdraw the lockwire from the case. The screw-threads of elements 75 and 95 are, preferably, fine threads so as to provide relatively high mechanical force multiplication so that tool 30 provides considerable pulling force for extraction of lockwire 12 from grooves 22 and 23 despite corrosion or other impediment to movement of the lockwire in these grooves.

It is evident that the nut serves to urge the rod from case passage 25 so as to withdraw lockwire 12 through this passage and from between the can 10 and head 11 of case 31. It is also evident that, since passage 25 extends tangentially of case surfaces 20 and 21 and since channel 70 and rod 75 extend from this passage, when nut 95 is so rotationally actuated, the lockwire is drawn tangentially from the case so that there is minimal friction between the passage sides and the lockwire.

Since tool 30 is fitted to case 31 by pin 63 through existing lifting lugs 40 and 41 and by the arcuate region 65 which conforms to the case exterior, the case is not damaged during extraction of lockwire 12 therefrom. Further, since rod 75 and pin 85 conform closely to the lockwire termination 50 and eye 13 and may be constructed of high strength materials—such as 440 C stainless steel and alloy music wire, respectively—these tool elements do not deform during such extraction and damage the lockwire.

It will be apparent to one skilled in the art of pulling implements, that other arrangements, which are connected to a rod corresponding to rod 75 at a rod motivating portion corresponding to rod portion 78 and are spaced from an attachment end portion corresponding to rod portion 77, may be provided to urge the rod from the case 31 so as to withdraw lockwire 12 therefrom. For examples, a pneumatic or an hydraulic cylinder or a winch may be directly or indirectly connected to such an attachment end portion to motivate it from the case when a tool, which has such an arrangement and in other respects more closely corresponds to tool 30, is mounted on the case in a operating position or relation corresponding to that depicted in FIGS. 1 and 2.

Referring again to tool 30 as shown in FIGS. 2 and 4, it can be seen that, when using tool 30 by rotation of nut 95 in a direction to extract lockwire 12 from case 31, the initial extraction movement of the lockwire can be observed through aperture 90. Typically, this rotation is continued to draw the lockwire into channel 70 for several inches or about 25 to 75 millimeters. Pin 85 is then removed from case bores 42 and tool bore 62 to dismount the tool body 55 from the case. The nut may then be rotated in the opposite direction so that attachment portion 77 of rod 75 can be returned to or beyond tool end 56. Pin 85 is then expelled from bores 83 and eye 13. When the tool is thus free from the case, the lockwire may be grasped with pliers or the like to complete the withdrawal of all of the lockwire, including its end 47, from the case.

However, sometimes corrosion or the like at case grooves 22 and 23 so hinders withdrawal of a lockwire, such as lockwire 12, that it is not practical to manually complete withdrawal of the lockwire as just described. For use with such recalcitrant lockwires, it will be apparent to one skilled in the art of pulling implements that a tool similar to tool 30 may be constructed with elements, which correspond to body 55, channel 70, and screw-threaded rod portion 78, greatly elongated so that the entire length of the lockwire, from its termination 50 with eye 13 to its tail end 47, may be drawn into such elongated channel by the screw-thread withdrawing action of a nut similar to nut 95 on such elongated rod portion.

Although the present invention has been herein shown and described in connection with what is conceived as the preferred embodiment, it is recognized that departures may be made therefrom within the scope of the invention, which is not limited to the illustrative details disclosed.

What is claimed is:

1. A removal tool for use with a predetermined structure having:

- an outer member with an exterior surface and an inner surface;
- an inner member fitted into the outer member at said inner surface;
- an elongated retaining member extending between the outer member and the inner member along said inner surface with the retaining member engaging both the outer member and the inner member so as to prevent relative movement between the outer member and the inner member;
- a passage in the outer member extending from said inner surface to a region of said exterior surface; and
- an end portion of the retaining member extending through said passage from said inner surface to said region, the tool comprising:
  - a body having a first side bearing a mounting portion conforming to said region of the exterior surface, having an opposite second side, and defining a channel extending in said body from said mounting portion toward said second side;
  - means for connecting said body with said outer member so that said mounting portion is disposed at said region;
  - an extraction member received in said channel for movement from and into said passage when said mounting portion is disposed at said region, said extraction member having an attachment end portion configured to receive said retaining member within said passage when said extraction member is extended at least partially into said passage;
  - means for connecting said attachment end portion to said retaining member when said retaining member is received in said end portion; and
  - means for urging said extraction member from said passage so as to withdraw said retaining member through said passage and from between the outer member and the inner member.

2. The tool of claim 1 wherein, in said structure, said outer surface and said inner surface are generally circular; said passage extends generally tangentially from said inner surface to said outer surface; and, at said region, said passage opens radially outwardly through said outer surface so that said end portion of said retaining member is accessible tangentially of said inner surface and generally radially of said outer surface, and wherein the tool further comprises said body defining a access opening disposed so that, when said body is connected with said outer member with said mounting portion of the body disposed at said region of said outer surface, said access opening provides access through said body to said attachment end portion in a direction generally radially of said outer surface to facilitate connection of said attachment end portion to said retaining member.

3. The tool of claim 2 wherein, in said structure, said end portion of the retaining member defines a withdrawing opening extending through said end portion generally radially of said outer surface, and wherein the tool further comprises:

- said attachment end portion defining an attaching opening conforming transversely to said withdrawing opening and disposed so as to align with said withdrawing opening when said attachment portion receives said retaining member; and an extraction pin conforming transversely to said drawing attaching opening and to said withdrawing opening, said extraction pin being insertable through said access opening into said attaching opening and said withdrawing opening, whereby said attachment end portion is connected to said retaining member.

4. The tool of claim 1 wherein:

said channel extends through said body;

said extraction member comprises a rod extending through said channel and beyond said second side, said rod being slidably received in said channel and having a screw-threaded end portion opposite said attachment end portion;

the tool includes means for preventing rotation of said rod relative to said body; and the tool has a rotatable member engaging said screw-threaded end portion outwardly of said second side, whereby appropriate rotation of said rotatable member urges said rod in a direction from said attachment end portion toward said screw-threaded end portion.

5. In combination, a lockwire removal tool and an existing case having a lockwire, the case including a cylindrical wall; a circular head fitted within said wall; a lockwire opening extending generally tangentially though said wall to said head; a lug disposed on said wall adjacent to said opening, said lockwire extending through said lockwire opening and about the head in engagement with the outer wall and the head; said lockwire having a termination disposed in said opening at the exterior of said outer wall; and said termination including a removal bore, the tool comprising:

a body having a first side bearing members conforming to the cylindrical wall and fitted to said lug for mounting the tool on the case in a predetermined position in relation to said opening, a second side, a channel extending in said body from said first side toward said second side, said channel being disposed as an extension of said lockwire opening when the tool is in said predetermined position, and an access opening extending through the body to said channel, said access opening being disposed at said lockwire opening when the tool is in said predetermined position;

means for releasably attaching said body to said lug when said body is in said predetermined position;

an extraction rod slidably fitted to said channel and having a attachment end, said attachment end being configured to receive said termination of the lockwire and having an attaching bore alignable with said removal bore when the tool is in said predetermined position and when said attachment end receives said termination;

an attachment pin fitted to said removal opening and said attaching bore; and means for urging said extraction rod in a direction along said channel away from the case when the tool is in said predetermined position, so that said attachment pin can be introduced through said access opening into said removal bore and said attachment bore; and the extraction rod then urged along said channel away from the case, whereby at least the lockwire termination is drawn from the case.

6. The combination of claim 5 wherein said lug has a first mounting bore, one of said members of the tool fitted to said lug for mounting the tool on the case has a second mounting bore aligned with the first mounting bore when the body is in said predetermined position, and said mounting means comprises a mounting pin insertable through said first mounting bore and said second mounting bore.

7. The combination of claim 5 wherein said termination of the lockwire has a rectangular cross section, said attachment end of said extraction rod has a slot conforming to said cross section so as to receive said termination, said attaching bore is one of two attaching bores extending oppositely from said termination, and said attachment pin is introduced through one of said attaching bores, said removal bore, and the other of said attaching bores so as to connect the lockwire to the extraction rod.

8. The combination of claim 7 wherein the tool further comprises said extraction rod having screw-threads and a screw-threaded element engaging said screw-threads so that, when the tool is in said predetermined position and the lockwire is connected to said rod, appropriate relative rotation of said element and the extraction rod withdraws the lock wire from the case.

9. A pulling implement for an elongated element having an end disposed between a pair of lugs extending from a work piece, said end being adjacent to the work piece and at one side of the lugs and having an eye, the implement comprising:

a puller rod including a work engaging extremity having a pair of jaws spaced transversely of said rod for reception of said end, each of said jaws defining an opening alignable with said eye when said end is received between said jaws, and a motivating portion connected to means for urging said rod in a direction from said work engaging extremity;

a body including a channel extending through the body and slidably receiving said puller rod, a mounting portion having an attachment projection extending generally parallel to said channel at one side of the channel and configured to extend between said lugs, a work piece engaging region disposed oppositely of said channel from said attachment projection and conforming to a corresponding region of the work piece, an aperture extending from the exterior of said body to said channel at a position along the channel for access to one of said jaws in a direction along said opening in said one of said jaws when said end is received between said jaws;

means disposed at said attachment projection for attaching said projection to said lugs when said projection is extended between said lugs; and a connecting pin configured to extend removably through said opening in each of said jaws and through said eye when said end is received between said jaws, so that, when said attachment projection is extended between said lugs and attached to said lugs; said work piece engaging region is engaged with said corresponding region of the work piece; and said jaws receive said end with the opening in each jaw aligned with said eye, said connecting pin can be introduced through said aperture and positioned through said opening in each of said jaws and through said eye, and said means for urging said rod in a direction from said work engaging extremity can be actuated to draw said elongated element from said work piece.

10. The implement of claim 9 wherein said work piece is generally cylindrical about a predetermined axis; said lugs extend generally radially of said axis and have aligned bores parallel to said axis; said end of said elongated element is extended tangentially from the work piece and said eye is a bore extending generally radially of said axis, and wherein:

said attachment projection has a bore disposed for alignment with said aligned bores when said work piece engaging region is engaged with said corresponding region of the work piece;

said means for attaching said projection to said lugs is a mounting pin removably insertable through said aligned bores; and said channel is disposed in said body and said puller rod is received in said channel so that said channel and said rod extend from said end in a direction tangentially of said work piece when the implement is mounted on the work piece in an operating position with said work piece engaging region engaged with said corresponding region of the work piece and said mounting pin inserted through said aligned bores, so that, when said implement is mounted on said work piece and said means for urging said rod in a direction from said work engaging extremity is actuated, said elongated element is drawn tangentially from said work piece.

11. The implement of claim 10 wherein the implement comprises said means for urging said rod in a direction from said work engaging extremity; said motivating portion of said puller rod bears screw-threads and extends from said body oppositely of said jaws; and said means for urging said rod in a direction from said work engaging extremity includes a nut screw-threadably engaged with said motivating portion outwardly of said body, whereby rotation of said nut so as to motivate said nut toward said body draws said puller rod through said channel from said work piece.

* * * * *